(12) United States Patent
Newburn et al.

(10) Patent No.: US 8,171,268 B2
(45) Date of Patent: May 1, 2012

(54) TECHNIQUE FOR CONTEXT STATE MANAGEMENT TO REDUCE SAVE AND RESTORE OPERATIONS BETWEEN A MEMORY AND A PROCESSOR USING IN-USE VECTORS

(75) Inventors: Chris J. Newburn, South Beloit, IL (US); Dion Rodgers, Hillsboro, OR (US); Bryant E. Bigbee, Scottsdale, AZ (US); Shivnandan D. Kaushik, Portland, OR (US); Gautham N. Chinya, Hillsboro, OR (US); Xiang Zou, Portland, OR (US); Hong Wang, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 751 days.

(21) Appl. No.: 11/230,721

(22) Filed: Sep. 19, 2005
(Under 37 CFR 1.47)

(65) Prior Publication Data
US 2008/0133898 A1 Jun. 5, 2008

(51) Int. Cl.
*G06F 9/30* (2006.01)
(52) U.S. Cl. ....................................... 712/228
(58) Field of Classification Search .................. 712/228; 718/108
See application file for complete search history.

(56) References Cited

U.S. PATENT DOCUMENTS

| | | | |
|---|---|---|---|
| 5,414,864 A * | 5/1995 | Koizumi | 712/228 |
| 5,682,531 A | 10/1997 | Nakamura | |
| 5,842,028 A | 11/1998 | Vajapey | |
| 5,878,264 A | 3/1999 | Ebrahim | |
| 5,974,512 A * | 10/1999 | Chiba | 711/162 |
| 5,999,730 A | 12/1999 | Lewis | |
| 6,061,711 A * | 5/2000 | Song et al. | 718/108 |
| 6,131,166 A | 10/2000 | Wong-Insley | |
| 6,205,543 B1 * | 3/2001 | Tremblay et al. | 712/228 |
| 6,209,085 B1 * | 3/2001 | Hammond et al. | 712/244 |
| 6,408,325 B1 * | 6/2002 | Shaylor | 718/108 |
| 6,438,708 B1 | 8/2002 | Shinichi et al. | |
| 6,440,073 B1 | 8/2002 | Robinson et al. | |
| 6,553,487 B1 | 4/2003 | Sukonik et al. | |
| 6,748,548 B2 | 6/2004 | Bormann et al. | |
| 7,194,644 B2 | 3/2007 | Durand et al. | |
| 2006/0149940 A1 | 7/2006 | Mukherjee | |
| 2008/0133898 A1 | 6/2008 | Newburn et al. | |
| 2009/0172439 A1 | 7/2009 | Cooper et al. | |

OTHER PUBLICATIONS

IBM Technical Disclosure Bulletin NA9008234, Aug. 1990, 4 pages.*
German Patent and Trademark Office, Office Action dated Aug. 27, 2008 in related foreign application.
The Patent Office of the State Intellectual Property Office of the People's Republic of China, Notice on First Office Action dated Sep. 4, 2009, in Chinese patent application No. 200810081746.4.

(Continued)

*Primary Examiner* — David Huisman
(74) *Attorney, Agent, or Firm* — Trop, Pruner & Hu, P.C.

(57) ABSTRACT

A technique for managing context state information enables a reduced number of save and restore operations. At least one embodiment includes a plurality of save area segments to store a plurality of machine context state information, which can be saved into the segments and restored to the machine state. One embodiment includes at least one in-use bit vector to indicate status of the plurality of machine context information stored in the segments, and another vector associated with the machine state.

5 Claims, 5 Drawing Sheets

OTHER PUBLICATIONS

The Patent Office of the State Intellectual Property Office of the People's Republic of China, Second Office Action dated Oct. 30, 2009, in Chinese patent application No. 200610139906.7.

Hewlett-Packard Corporation, et al., "Advanced Configuration and Power Interface Specification," Revision 3.0b, Oct. 10, 2006, pp. 402-415.

* cited by examiner

TECHNIQUE FOR CONTEXT STATE MANAGEMENT TO REDUCE SAVE AND RESTORE OPERATIONS BETWEEN A MEMORY AND A PROCESSOR USING IN-USE VECTORS

FIELD

Embodiments of the invention relate to microprocessor architecture. More particularly, embodiments of the invention relate to managing context state information within a microprocessor.

BACKGROUND

Modern microprocessors may perform numerous functions requiring a change of context state. For example, a microprocessor may change context state information when switching between groups of instructions, such as software "threads". In changing between software threads, for example, context state of one group of instructions may be saved to a memory location and the context state of another group of instructions may be restored from memory and loaded into the microprocessor.

In reference to software threads, "context state" may refer to a portion of each software thread's state that is to be maintained between context switches within a processor. Context state may be stored in processor architectural registers, control registers, or other storage areas, such as memory. Context state is typically represented by a number of bits, the value of which define a particular context state.

The term, "context switch", typically refers to a change from one processor execution state to another, such as a software thread switch. A context switch is typically performed either by the operating system or by a user's program. For example, a context switch may occur as a result of calling a subroutine within a user's program, in which the calling program's context is saved in a storage area, such as a "stack", when the call to the subroutine occurs and restored from the storage area when returning from the called subroutine.

Typically, context state is saved to memory or restored to processor registers in groups that may include more context state information that is needed at a given time, due to the organization of context state save areas in memory and the granularity with which these save areas are addressed. As a result, an unnecessarily large number of processor state information may be replaced each time context state is restored from memory. For example, an operating system or user program may only request a subset of context state information pertaining to a particular software thread or other process being performed within a processor. However, prior art context state save and restore mechanisms may require that all context state pertaining to a thread or other process be restored and/or saved in order to retrieve any context state information pertaining to the thread or process of interest.

Prior art context state management techniques can, therefore, result in performance and resource inefficiencies.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Figure 1:
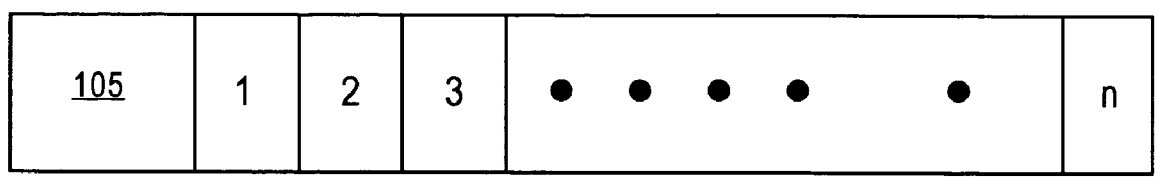
FIG. 1 is a diagram illustrating a save area with save area segments, according to one embodiment of the invention.

Embodiments of the invention pertain to microprocessor architecture. More particularly, embodiments of the invention pertain to managing processor context state. At least one embodiment of the invention introduces extended functionality to some prior art context state managing techniques in order to facilitate resource and performance efficiency when reading and updating context state information within a microprocessor.

Operating systems and/or user programs typically use an area ("save area") in a memory structure, such as dynamic random access memory (DRAM), for saving context state during a context switch. In other prior art systems, some software routines, such as exception handlers, may allocate the save area only as needed ("dynamically") in a memory storage area, such as a stack. Instruction set architectures typically define one or more instructions to handle the storage of context state to memory or the restoration of context state therefrom. For example, in one instruction set architecture, two instructions, (e.g., "FXSAVE" and "FXRSTOR") may be used to store context state to memory and restore context state from a memory to a processor's registers, respectively. In other instruction set architectures more or fewer than two instructions may be used to manage context state information.

In at least one embodiment of the invention portions, "segments", or "sections" of a save area are defined that may be initialized and used to store and access context state information without initializing, saving, or restoring the entire save area. Allowing access to segments of a context state save area conserves the amount of time and storage area that must be used to update, initialize, or read context state information, in one embodiment of the invention.

Furthermore, in at least one embodiment of the invention an "in-use" bit or group of in-use bits ("bit vector") within a save area is provided to indicate whether a particular save area segment or group of save area segments contain valid information. An in-use bit or bit vector may facilitate further context state management efficiency by negating the need for a validity check to be made after context state is restored from memory to processor registers. Instead, an in-use bit or bit vector may simply be read to determine whether the corresponding segment contains valid information.

Embodiments of the invention may also include a mechanism to determine whether save area segments have been initialized before saving the context state information contained within a segment to determining whether the segment has been initialized. In one embodiment, a save area segment may be checked to determine whether it has been initialized by reading an initialization bit or bits associated with the segment. More specifically, in one embodiment of the invention, the in-use bit or bit vector may be used to determine whether a particular segment has been initialized. In one embodiment, context state is initialized by a software routine (e.g., "micro-code") writing a segment or segments to an initial value, whereas in other embodiments a processor may include logic to initialize context state.

Other features of various embodiments will be described herein, including a mechanism to clear a save area segment of context state information, a mechanism for detecting and handling errors within a contest state save area segment, and a mechanism for enabling and managing additional architectural features whose state is reflected in one or more context state save area segment. Specifically, at least one architectural feature will be described pertaining to monitoring various performance aspects of a processor, which may use various context state management features and techniques described herein.

Furthermore, at least one embodiment of the invention may include a modular architecture to allow for an expanded number of context state save area segments to be implemented to store context information related to other features of the processor. In addition, in one embodiment, the expanded number of context state save area segments and corresponding context state information may be included in a manner that is transparent to an operating system being executed by the processor. In other words, at least one embodiment includes context state management techniques that do not necessarily involve modification of or even notification to an operating system being executed on a processor in which embodiments of the invention are used.

FIG. 1 illustrates a save area including save area segments according to one embodiment of the invention. In particular, save area 100 is a 512 byte buffer divided into "n" number of segments. In the embodiment illustrated in FIG. 1, each segment is 512/n bytes, but may be larger or smaller in other embodiments, depending on the size of the storage area and the number of segments. Each segment illustrated in FIG. 1 may store a different type of context state information, examples of which will be discussed further below. In one embodiment, save area 100 includes a header area 105 containing an in-use bit vector to indicate status information for each of the segments.

In one embodiment, save area segments represent the smallest granularity of storage in a save area in which context state information may be saved, initialized and restored. In at least one embodiment, the save area segments may be initialized, used and managed independently of each other. Furthermore, as new architectural features requiring additional context state are added to a processor to which the save area of FIG. 1 corresponds, new save area segments may be added accordingly. However, in some embodiments, a single save area segment may include context state information associated with one or more features, included added features.

A save area segment may also be reset to an initial state without effecting the state of other segments, such as during a restore operation or an error recovery operation. For example, in one embodiment, if a restore operation is performed, all processor context state not updated by the restore operation are set to an initialized state. The initialized processor context state may then be stored back to their corresponding save area segments.

Numerous examples of uses for the save area segments illustrated in FIG. 1 may be realized, depending on the needs of the computer system in which they are used. In one embodiment of the invention, one may avoid saving and restoring state context to and from save area segments, respectively, that is in an initialized state by assuring that context state is placed in an initialized state between a context save operation and context restore operation or when the processor is reset.

Figure 2:
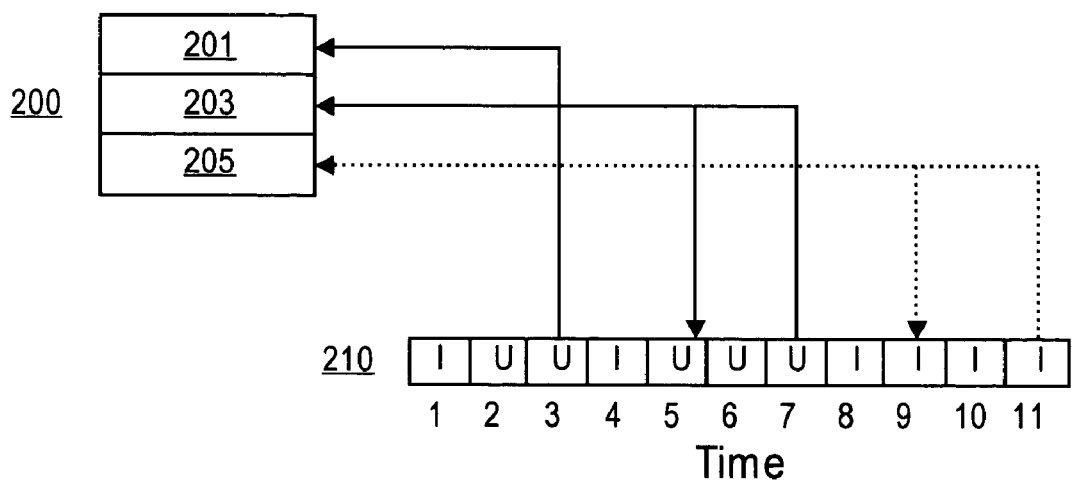
FIG. 2 is a diagram illustrating the operation of using save state segments, according to one embodiment of the invention.

For example, FIG. 2 illustrates the operation of using at least one save area segment to store information to indicate when a corresponding context state information ("state element") is in use, or otherwise valid. Particularly, FIG. 2 illustrates three different context states within three context state area segments 201, 203, 205, stored in save area 200 and their restoration into machine state 210 as a function of time. In reference to FIG. 2, initialized context state is indicated by an "I" in the instances of the machine context state 210 illustrated in FIG. 2, whereas a context state instance that is in use is indicated by a "U".

At time instance "1", the machine context state is in an initialized state, indicated by an "I", whereas at time instance "2", the machine context is modified, indicated by a "U", via instructions being executed in the processor to a first context state. At time instance "3", the first context state is stored to context state area segment 201, and the corresponding machine context state is initialized again, or "cleared", at time instance "4", indicated by an "I". At time instance "5", a second context state is restored to machine state from save area segment 203 and the machine state is once again in use, indicated by a "U". The machine state is once again modified at time instance "6" via instructions being executed in the processor, and at time instance "7", the machine state is stored to context save area segment 203. At time instance "8", machine context state is once again initialized to an initial state value, and the machine context state at time instance "8" is marked as unused. Similarly, a null restore of the context state stored in save area segment 205 is performed at time instance "9", which updates the machine state with no new state information. At time instance "10", the processor does not update the machine context state with any new information, so at time instance "11", a null store is performed to store the machine context state (which is initialized state) back to save area segment 205.

In one embodiment of the invention, null save operations (i.e., those operations that save an unused, initialized, or otherwise invalid machine context to a save area segment) and/or null restore operations (i.e., those operations that restore an unused, initialized, or otherwise invalid context state from a save area segment to machine state) may be replaced by detecting the state of an "in use" bit or bits that correspond to the context state being saved or restored. For example, in one embodiment, an in-use bit vector is maintained within the save area to indicate whether context state information within one or more of the save area segments contains information that is unused or otherwise invalid in order to alleviate the context state from having to be read out of the save area segment(s) into machine state if the context state is unused or otherwise invalid.

Likewise, an in-use bit vector may be maintained in conjunction with the machine state within the processor to indicate whether context state information within the machine state is unused or otherwise invalid in order to alleviate the context state from having to be stored to the save area segment(s) from the machine state if the context state is unused or otherwise invalid. In some embodiments, an in-use bit vector may be maintained both for the save area segments as well as the machine state, whereas in other embodiments one in-use bit vector may be maintained for either or both the save area segments and the machine state.

In one embodiment, one or more instructions may be used to update the in-use bit vector(s) to indicate whether context state information corresponding to a particular save area segment is in use. For example, in one embodiment, one instruction (e.g., "STMXCSR" in one instruction set architecture) may be executed by a processor to set the in-use bit vector(s) to indicate that state information corresponding to one or more save area segments is currently in-use, or that the save area segment otherwise contains valid data.

Figure 3:
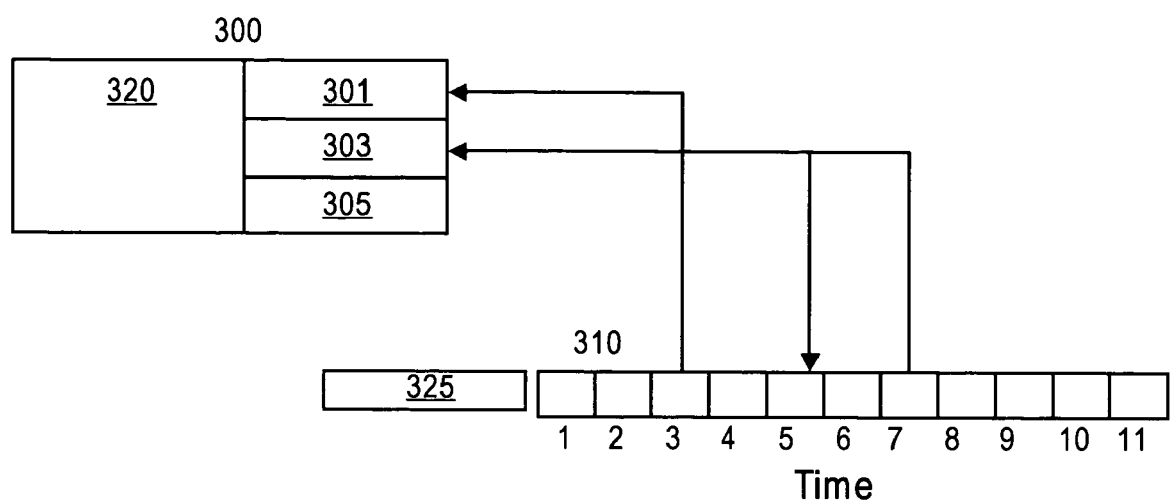
FIG. 3 illustrates operation of at least one embodiment, in which an in-use bit vector is used to alleviate null restore and null save operations.

FIG. 3 illustrates the operation of one embodiment, in which an in-use bit vector is maintained for the save area segments and for the machine state. FIG. 3 is similar to FIG. 2, except that the save area contains an in-use bit vector 320 having a number of entries equal to the number of save area segments. In one embodiment, each in-use bit vector 320 entry contains a bit to indicate whether a corresponding save area segment contains information that is valid or whether it contains invalid information, such as when the segment is initialized. Similarly, an in-use bit vector 325 is maintained for the machine state to indicate whether a machine state corresponding to a particular save area segment contains valid information or whether the machine state corresponding to a particular save area segment is invalid, such as when the machine state has been placed in an initialization state.

In the embodiment illustrated in FIG. 3, null save and null restore operations are not necessary, since a program or logic may first detect whether the state information is valid or invalid before performing the null save or null restore operation. If the null save or restore operation corresponds to state information that is invalid, no null save or restore operation need be performed, saving processing cycles, in one embodiment.

In one embodiment of the invention, context state information is stored and restored to and from store area segments, respectively, when monitoring various events, or "scenarios", within a microprocessor. For example, in one embodiment machine state is maintained in scenario-specific groups, or "channels". Channels may hold configuration information, including conditions to be monitored ("trigger" conditions) within a processor, and the actions that should be taken in response thereto, such as asynchronously transferring control to a certain instruction address within a software thread. Furthermore, in one embodiment, a channel may or may not be valid, and if a channel is not valid, that channel may or may not be saved or restored.

In one embodiment, channel information is programmed by performing an instruction, which may use inputs stored in registers, such as 32 or 64-bit registers. In addition to channel information, context state information may also include header information that may apply to one or more channels. The following illustrates context state information for two channels and corresponding header information, according to one embodiment, that may be stored in a save area segment or restored to processor context state:

| Content Description | Byte Offset |
|---|---|
| Header | 0-7 |
| Yield Trigger | 8-15 |
| Reserved | 16-31 |
| Channel 0 | 32-63 |
| Channel 0 Configuration Information | 32-39 |
| Channel 0 Configuration Information | 40-47 |
| Channel 0 Configuration Information | 48-55 |
| Channel 0 Configuration Information | 56-63 |
| Channel 1 | 64-95 |
| Channel 1 Configuration Information | 64-71, 72-79, 80-87, 88-95 |

The 96-byte context state information illustrated in the above table includes header information in bits 0-7, relevant to two channels whose context state information is contained in bits 32-63 and 64-95, respectively. In one embodiment, the header information may include an in-use bit for each channel, in addition to other information. In addition, the above context state information includes an instruction pointer in bits 8-15 and a reserved field in bits 16-31.

In some embodiments, each save area segment may have a corresponding validity indicator to indicate if errant data is stored in the corresponding save area segment, in order to allow various actions to be taken in response thereto. For example, in one embodiment, in response to detecting an error within a save area segment, software, hardware logic, or some combination thereof may implement an algorithm to perform various operations, including one or more of: 1) initializing the save area segment containing the error, 2) initializing the processor state information corresponding to some or all save area segments. Furthermore, in one embodiment, the processor state may be initialized in response to detecting an area within the context state header field or other field besides the save area segment.

An error may be detected, in one embodiment, when a save area segment is restored to processor state. In response to detecting the error, the in-use bits may indicate that the segment is invalid and therefore the in-use bits subsequently cleared when the segment is stored to memory. Therefore, in one embodiment, whether the segment is indicated to be invalid due to an error or due to lack of initialization, for example, may be indistinguishable from the standpoint of an observer of the in-use bits.

In one embodiment, an in-use bit vector is used to reflect the validity of state information stored in each save area segment. For example, in the case where each save area segment corresponds to a particular event monitoring channel, as illustrated in the table discussed above, the header information may contain an in-use bit vector, the bits of which each indicate the validity of a corresponding set of channel information stored in a save area segment. Indicating whether a save area segment contains an error can help software or processor hardware determine whether to restore and subsequently use the context state information contained within.

Figure 4:
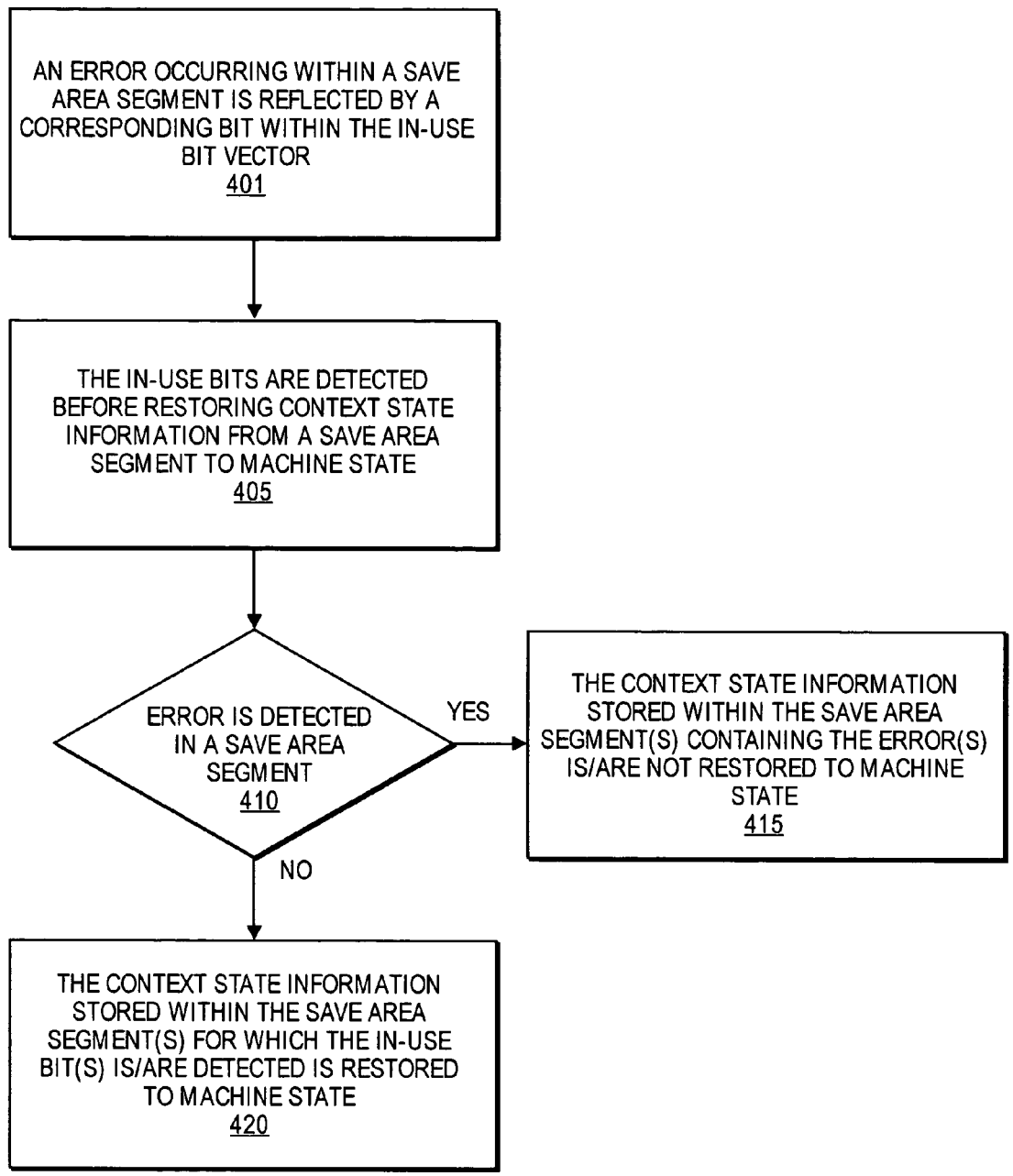
FIG. 4 is a flow diagram illustrating a technique to indicate and detect errors within a save area segment, according to one embodiment of the invention.

FIG. 4 is a flow diagram illustrating various operations that may be performed when errors are indicated and detected within a save area segment, according to one embodiment of the invention. At operation 401, an error occurring within a save area segment is reflected by a corresponding bit within the in-use bit vector. In one embodiment, the in-use bit vector may be within a header field of a save area corresponding to a number of event monitoring channels. In other embodiments, the in-use bit vector may be stored along with save area segments corresponding to various software threads.

At operation 405, the in-use bits are detected before restoring context state information from a save area segment to machine state. If, at operation 410, an error is detected in a save area segment, then at operation 415, then the context state information stored within the save area segment(s) containing the error(s) is/are not restored to machine state. Otherwise, at operation 420, the context state information stored within the save area segment(s) for which the in-use bit(s) is/are detected is restored to machine state. In one embodiment, the in-use bits may be compared to a mask field to detect errors within the corresponding save area segments, whereas in other embodiments other detection methods may be used.

In some embodiments, the save, restore, and/or initialization operations (e.g., instructions) may use a mask field to modify or read the contents of the save area segments. For example, in one embodiment, a mask field whose entries correspond to the in-use bit vector entries may be an operand of a Boolean logic operations (e.g., XOR, AND, OR), the result of which may determine the state of the in-use bit vector and therefore the various segments' validity.

Figure 5:
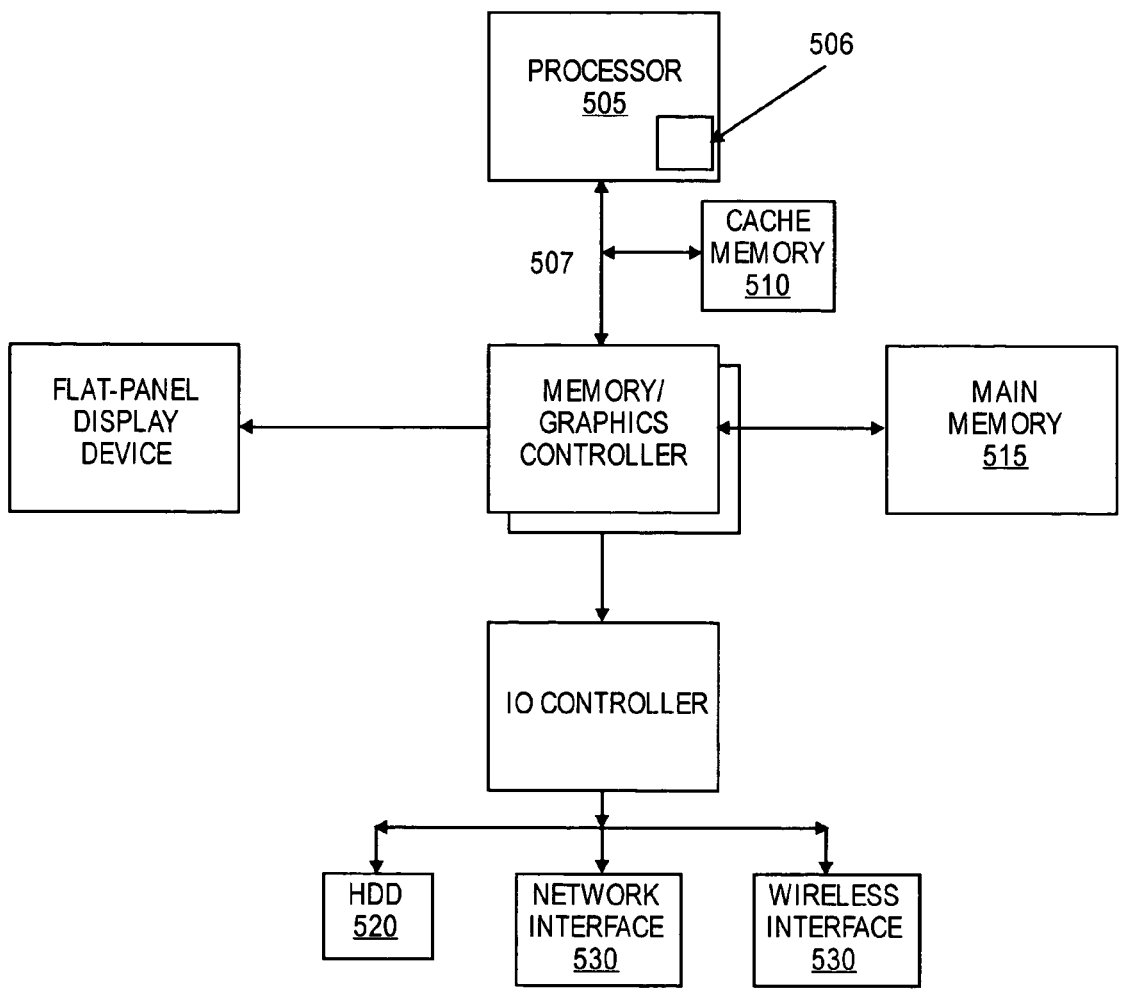
FIG. 5 is a shared bus computer system in which at least one embodiment of the invention may be used.

FIG. 5 illustrates a front-side-bus (FSB) computer system in which one embodiment of the invention may be used. A processor 505 accesses data from a level one (L1) cache memory 510 and main memory 515. In other embodiments of the invention, the cache memory may be a level two (L2) cache or other memory within a computer system memory hierarchy. Furthermore, in some embodiments, the computer system of FIG. 5 may contain both a L1 cache and an L2 cache.

Illustrated within the processor of FIG. 5 is a storage area 506 for machine state. In one embodiment storage area may be a set of registers, whereas in other embodiments the storage area may be other memory structures. Also illustrated in FIG. 5 is a storage area 507 for save area segments, according to one embodiment. In other embodiments, the save area segments may be in other devices or memory structures. The processor may have any number of processing cores. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 520, or a memory source located remotely from the computer system via network interface 530 containing various storage devices and technologies. The cache memory may be located either within the processor or in close proximity to the processor, such as on the processor's local bus 507.

Figure 6:
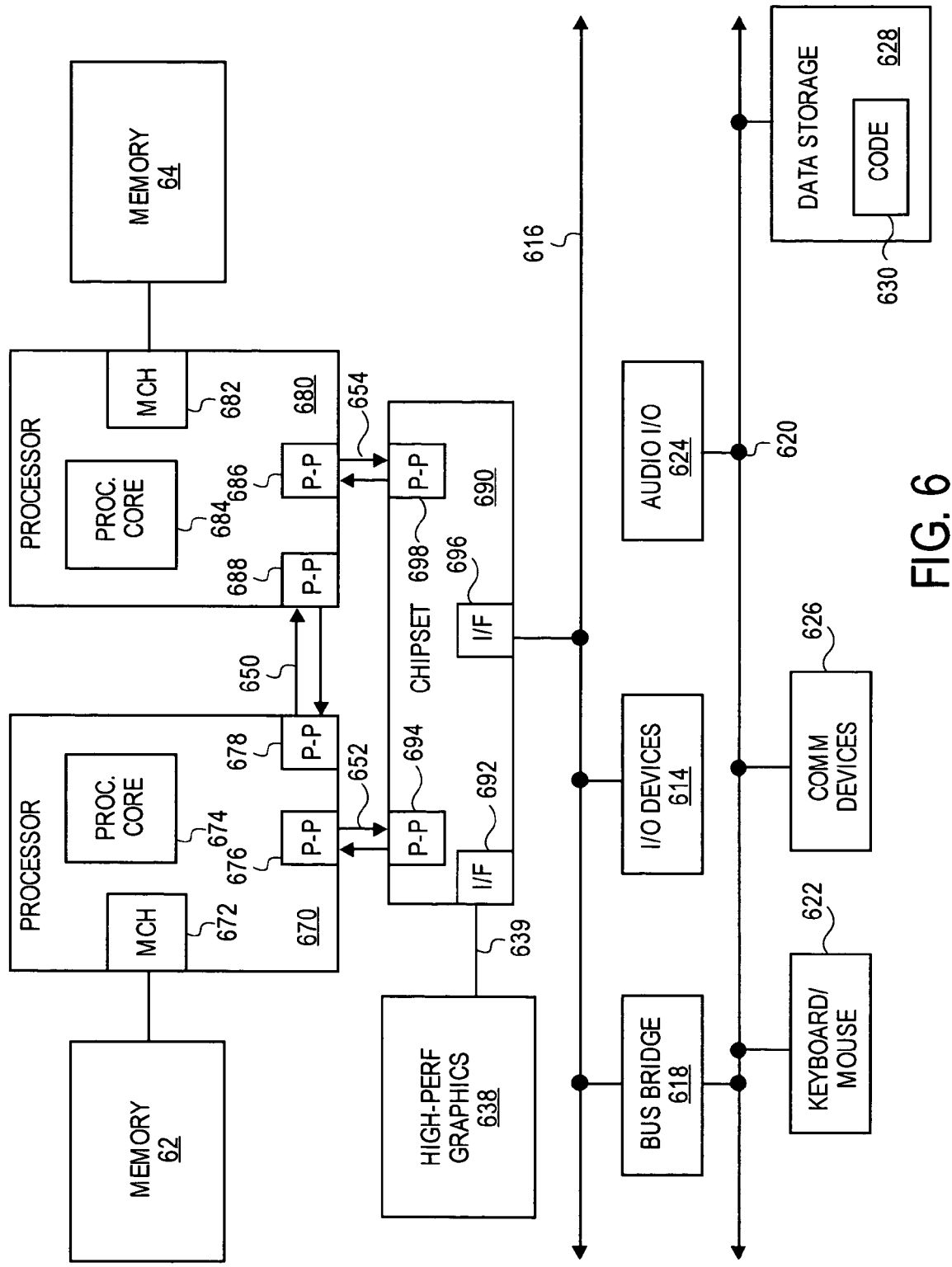
FIG. 6 is a point-to-point computer system in which at least one embodiment of the invention may be used.

Furthermore, the cache memory may contain relatively fast memory cells, such as a six-transistor (6T) cell, or other memory cell of approximately equal or faster access speed. The computer system of FIG. 5 may be a point-to-point (PtP) network of bus agents, such as microprocessors, that communicate via bus signals dedicated to each agent on the PtP network. FIG. 6 illustrates a computer system that is arranged in a point-to-point (PtP) configuration. In particular, FIG. 6 shows a system where processors, memory, and input/output devices are interconnected by a number of point-to-point interfaces.

The system of FIG. 6 may also include several processors, of which only two, processors 670, 680 are shown for clarity. Processors 670, 680 may each include a local memory controller hub (MCH) 672, 682 to connect with memory 22, 24. Processors 670, 680 may exchange data via a point-to-point (PtP) interface 650 using PtP interface circuits 678, 688. Processors 670, 680 may each exchange data with a chipset 690 via individual PtP interfaces 652, 654 using point to point interface circuits 676, 694, 686, 698. Chipset 690 may also exchange data with a high-performance graphics circuit 638 via a high-performance graphics interface 639. Embodiments of the invention may be located within any processor having any number of processing cores, or within each of the PtP bus agents of FIG. 6.

Other embodiments of the invention, however, may exist in other circuits, logic units, or devices within the system of FIG. 6. Furthermore, in other embodiments of the invention may be distributed throughout several circuits, logic units, or devices illustrated in FIG. 6.

Various aspects of embodiments of the invention may be implemented using complimentary metal-oxide-semiconductor (CMOS) circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. A hardware processor comprising:
   a storage to store:
      a plurality of channel data having configuration information including triggering conditions for an aspect of the processor's operation to be monitored, and wherein the channel data includes information regarding an action to be taken responsive to occurrence of a corresponding triggering condition including an asynchronous transfer of control on occurrence of the triggering condition to an instruction address within a software thread; and
      a header field to store a plurality of in-use bits corresponding to and separate from the plurality of channel data, wherein the in-use bits are to indicate whether the plurality of channel data are to be saved to a plurality of save area segments of a memory coupled to the processor, wherein the processor is to communicate the plurality of channel data to the memory having the plurality of save area segments each to store a corresponding one of the plurality of channel data, wherein channel data stored in each of the plurality of save area segments may be restored to the processor storage independently of other channel data stored in others of the plurality of segments, the save area segments of the memory further including a header area to store an in-use bit vector having a plurality of entries, each entry of the in-use bit vector to indicate whether the channel data stored within a corresponding segment is to be used as the channel data to be stored in the processor, the memory further including logic to detect whether a first segment of the plurality of save area segments is valid and if so, to restore the first segment to the storage of the processor and otherwise to prevent the restore, and to detect an error occurring in a second segment of the plurality of segments and to indicate the error by updating the in-use bit vector entry corresponding to the second segment.

2. The processor of claim 1 wherein one of the plurality of channel data is to be saved to one of the plurality of save area segments only if the in-use bit to which the one of the plurality of channel data corresponds indicates that the one of the plurality of channel data is valid.

3. The processor of claim 1 wherein one of the plurality of channel data is to be saved to one of the plurality of save area segments only if the in-use bit to which the one of the plurality of channel data corresponds indicates that the one of the plurality of channel data does not contain errors.

4. The processor of claim 2, wherein if the one of the plurality of channel data is not valid, then it is to be placed in an initialized state.

5. The processor of claim 4, wherein if the one of the plurality of channel data contains an error, then it is to be placed in an initialized state.

* * * * *